(12) United States Patent
Martine et al.

(10) Patent No.: US 10,896,380 B2
(45) Date of Patent: Jan. 19, 2021

(54) DETERMINING INTENT BASED ON USER INTERACTION DATA

(71) Applicant: Facebook, Inc., Menlo Park, CA (US)

(72) Inventors: Christian Alexander Martine, Austin, TX (US); Robert Oliver Burns Zeldin, Los Altos, CA (US); Dinkar Jain, Menlo Park, CA (US); Jurgen Anne Francois Marie Van Gael, Cambridge (GB); Anand Sumatilal Bhalgat, Mountain View, CA (US); Tianshi Gao, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 737 days.

(21) Appl. No.: 15/691,161

(22) Filed: Aug. 30, 2017

(65) Prior Publication Data
US 2019/0065978 A1 Feb. 28, 2019

(51) Int. Cl.
*G06N 7/00* (2006.01)
*H04L 29/08* (2006.01)
*G06N 20/00* (2019.01)
*G06Q 30/02* (2012.01)

(52) U.S. Cl.
CPC ............ *G06N 7/005* (2013.01); *G06N 20/00* (2019.01); *H04L 67/20* (2013.01); *H04L 67/22* (2013.01); *G06Q 30/0202* (2013.01)

(58) Field of Classification Search
CPC .................................................. G06Q 30/0241
USPC ....................................................... 706/15, 45
See application file for complete search history.

(56) References Cited

U.S. PATENT DOCUMENTS

| | | | |
|---|---|---|---|
| 9,553,918 B1* | 1/2017 | Manion | H04L 67/06 |
| 2016/0247165 A1* | 8/2016 | Ryabchun | G06Q 30/016 |
| 2017/0098236 A1* | 4/2017 | Lee | G06Q 30/0244 |
| 2018/0189843 A1* | 7/2018 | Kulkarni | G06Q 30/0242 |

* cited by examiner

*Primary Examiner* — David R Vincent
(74) *Attorney, Agent, or Firm* — Fenwick & West LLP

(57) ABSTRACT

A system predicts user intent to take an action and delivers content items to the user that match that intent. A plurality of features or attributes for each tracking pixel in a set of tracking pixels can be acquired based on content items and landing pages associated with each tracking pixel. For example, features for a tracking pixel can be determined based on information associated with a content item that enabled a user to access a landing page from which the tracking pixel was fired or triggered. In this example, features for the tracking pixel can also be determined based on information associated with the landing page. The features for the tracking pixels can be utilized to train a machine learning model. The machine learning model can be trained to predict whether or not a particular user intends to produce a conversion (e.g., make a purchase).

20 Claims, 4 Drawing Sheets

400

Generate a plurality of features for each tracking pixel in a set of tracking pixels used by a third party system to track actions of users on the third party system
402

Train a machine learning model based on the features generated about what particular action a given content item and landing page associated with each tracking pixel is directed to getting a user to take
404

Generate a plurality of features for the user based on interaction data associated with the user relating to prior interactions by the user that relate to content provided to the user that ultimately led to the user taking a previous particular action
406

Train the machine learning model based on the features generated for the user to predict an intent of the user to take a future particular action based on the user having again had interactions similar to those that ultimately led to the user taking the previous particular action
408

Apply the machine learning model to predict the intent of the user to take the future particular action and to select content items directed to getting the user to take the future particular action
410

Provide a particular content item of the selected content items to the user based on the intent predicted for the user
412

400

Generate a plurality of features for each tracking pixel in a set of tracking pixels used by a third party system to track actions of users on the third party system
402

Train a machine learning model based on the features generated about what particular action a given content item and landing page associated with each tracking pixel is directed to getting a user to take
404

Generate a plurality of features for the user based on interaction data associated with the user relating to prior interactions by the user that relate to content provided to the user that ultimately led to the user taking a previous particular action
406

Train the machine learning model based on the features generated for the user to predict an intent of the user to take a future particular action based on the user having again had interactions similar to those that ultimately led to the user taking the previous particular action
408

Apply the machine learning model to predict the intent of the user to take the future particular action and to select content items directed to getting the user to take the future particular action
410

Provide a particular content item of the selected content items to the user based on the intent predicted for the user
412

Provide, for review, information associated with a particular tracking pixel in the set of tracking pixels
452

↓

Acquire feedback from the review of the information associated with the particular tracking pixel
454

↓

Apply, based on the feedback from the review, one or more weights to one or more features for the particular tracking pixel
456

FIG. 4B

DETERMINING INTENT BASED ON USER INTERACTION DATA

BACKGROUND

This disclosure relates generally to online systems, and in particular, to determining a prediction of an intent of an online system user.

An online system, such as a social networking system, can allow its users to connect to and to communicate with other online system users. Via the online system, users may create profiles or accounts that are tied to their identities and can include information about the users, such as interests and demographic information. The users may be individuals or entities such as corporations or organizations. Because of the increasing popularity of online systems and the increasing amount of user-specific information maintained by online systems, online systems can provide an ideal forum for advertisers to increase awareness about products or services by presenting advertisements to online system users.

Presenting content to users of an online system can allow a content provider to promote products, services, opinions, and/or causes. Additionally or alternatively, presenting content can allow the advertiser to persuade online system users to take action with respect to these products, services, opinions, and/or causes. However, under conventional approaches specifically arising in the realm of computer technology, it can be difficult for an online system to know, understand, determine, and/or predict the intentions of users with respect to taking action. For example, online systems that are search engines have more direct insight into what a user is interested in since the user inputs search terms describing those interests. But in systems where users are not providing this type of direct insight, the system may need a more creative approach to predict users' intent and find appropriate or relevant content to be selected for presentation to users via online systems.

SUMMARY

An online system, such as a social networking system, predicts likely intent of a user in taking certain actions and delivers content items matching the user's intent. To make this prediction effectively, the system trains one or more machine learning models to verify the accuracy of tracking pixels in reporting actions of users including by predicting the purpose of a content item or landing page and examining pixel fire data reported, and to predict a particular user's intent based on prior actions by that user. Features are collected for training the one or more models via human rater analysis or via machine or other analysis of data related to the content items, landing page, pixel fire, user, etc.

The online system can enable tracking pixels, web beacons, and/or other portions of computer code to be included in a third party web resource, such as a third party website. When users of the online system perform certain actions at landing pages or other web pages of third party websites, the tracking pixels can be triggered (i.e., executed, initiated, fired, etc.). A triggered tracking pixel can provide to the online system various types of data, such as information associated with a third party website (e.g., information associated with a landing page of the third party website), information associated with a user utilizing the third party website, and/or information associated with an interaction or action performed by the user with respect to the third party web site, etc. As another example, data can be collected as a mobile application event from the mobile application of the third party that is configured to use a software development kit (SDK) or application programming interface (API) associated with the online system for delivering data about user interactions on the mobile app.

In some embodiments, a plurality of features for each tracking pixel or mobile app event in a set of tracking pixels or mobile app events can be generated, created, or otherwise acquired (e.g., via human raters) based on a set of one or more content items associated with each tracking pixel and a set of one or more landing pages associated with each tracking pixel. For example, a plurality of features or attributes for a tracking pixel can be received, obtained, determined, or otherwise acquired based on information associated with a content item that enabled a user to access a landing page from which the tracking pixel was fired. The plurality of features or attributes for the tracking pixel can also be received, obtained, determined, or otherwise acquired based on information associated with the landing page. In this example, at least some of the plurality of features for the tracking pixel can be identified or otherwise acquired based on one or more features associated with the content item and/or one or more features associated with the landing page. These features for the content item and landing page can be created based on, for example, human raters analyzing the content item and landing page to gather data and label the purpose of each (such as whether they encourage a user to install an application, to sign up for a membership, to make a purchase, or otherwise). In one embodiment, human raters can also verify the accuracy of pixels used by third parties to detect actions by users (e.g., whether a pixel correctly reports that a user had a purchase event).

The acquired plurality of features for the tracking pixels can be utilized to train at least one machine learning model. In other words, the acquired plurality of features for the tracking pixels can be utilized as training data to build, develop, train, improve, and/or refine the at least one machine learning model. In some instances, the machine learning model can be trained to recognize, determine, and/or predict whether or not a particular user intends to produce a conversion (e.g., make a purchase). Moreover, in some implementations, interaction data associated with a user of a social networking system can be acquired. For instance, the disclosed technology can receive, obtain, and/or otherwise acquire historical web visitation data for the user based on the firing or triggering of various tracking pixels at various landing pages over a period of time. The interaction data associated with the user (e.g., web visitation data) can be applied to the machine learning model trained based on the plurality of features for each tracking pixel in the set of tracking pixels. In some cases, the interaction data associated with the user can be inputted into the machine learning model. In other cases, it can be used to train a separate machine learning model specific to a particular user's intent based on actions the user has taken in the past. Again, human raters or other mechanisms can be used to analyze samples of, for example, previous purchases made by users, to produce model training features, including looking at the user's pixel fire or app event history and identifying events that were associated with an action that the user ultimately took (e.g., a purchase by the user). Accordingly, the machine learning model(s) can, for instance, output, generate, and/or otherwise determine a prediction of an intent of the user to take action in association with a particular content item provided to the user via the social networking system. In one example, a confidence score representing a likelihood that a conversion (e.g., making a purchase) will result from the user being provided with the particular content item can be determined. It should be appreciated that there can be many variations associated with the disclosed technology.

BRIEF DESCRIPTION OF THE DRAWINGS

FIG. 4A illustrates a flowchart describing an example process of determining intent based on interaction data, in accordance with an embodiment.

FIG. 4B illustrates a flowchart describing an example process of determining intent based on interaction data, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
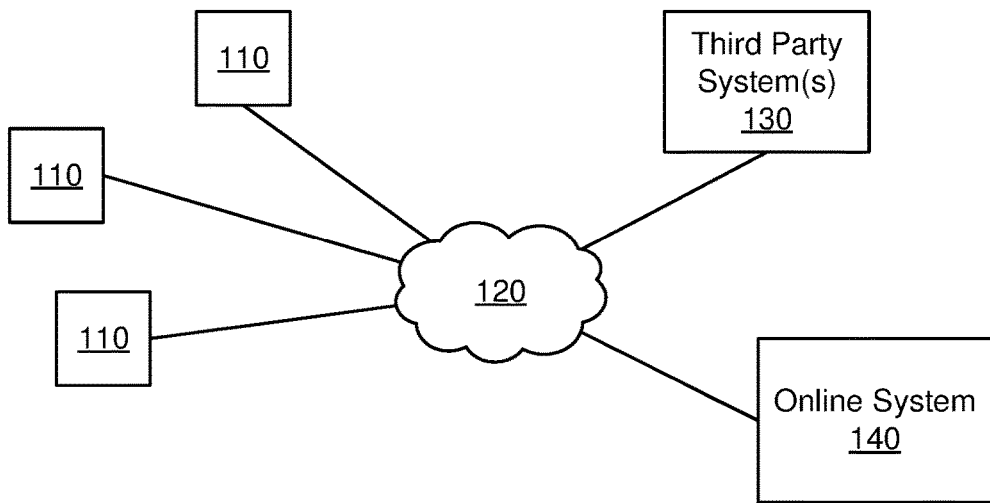
FIG. 1 illustrates a block diagram of an example system environment in which an example online system operates, in accordance with an embodiment.

FIG. 1 illustrates a block diagram of an example system environment 100 in which an example online system 140 operates, in accordance with an embodiment. The example system environment 100 shown in FIG. 1 can comprise one or more client devices 110, a network 120, one or more third party systems 130, and the online system 140. In alternative configurations, different and/or additional components may be included in and/or removed from the system environment 100. In some cases, the online system 140 can, for example, be a social networking system, a content sharing network, and/or another system for providing content to users of the system, etc.

The client devices 110 can be one or more computing devices or systems capable of receiving user input as well as transmitting and/or receiving data via the network 120. In one implementation, a client device 110 is a conventional computer system, such as a desktop or a laptop computer. Alternatively, a client device 110 may be a device having computer functionality, such as a personal digital assistant (PDA), a mobile telephone, a smartphone, a wearable device, or another suitable device. A client device 110 can be configured to communicate via the network 120. In one embodiment, a client device 110 executes an application allowing a user of the client device 110 to interact with the online system 140. For example, a client device 110 can execute an application provided by the online system or a browser application in order to enable interaction between the client device 110 and the online system 140 via the network 120. In another embodiment, a client device 110 can interact with the online system 140 through an application programming interface (API) running on a native operating system of the client device 110, such as IOS® or ANDROID™. It should be understood that many variations are possible.

The client devices 110 can be configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 can include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Moreover, one or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on a client device 110. In other embodiments, a third party system 130 provides content or other information for presentation via a client device 110. A third party system 130 may also communicate information to the online system 140, such as advertisements, content, or information about an application provided by the third party system 130.

Figure 2:
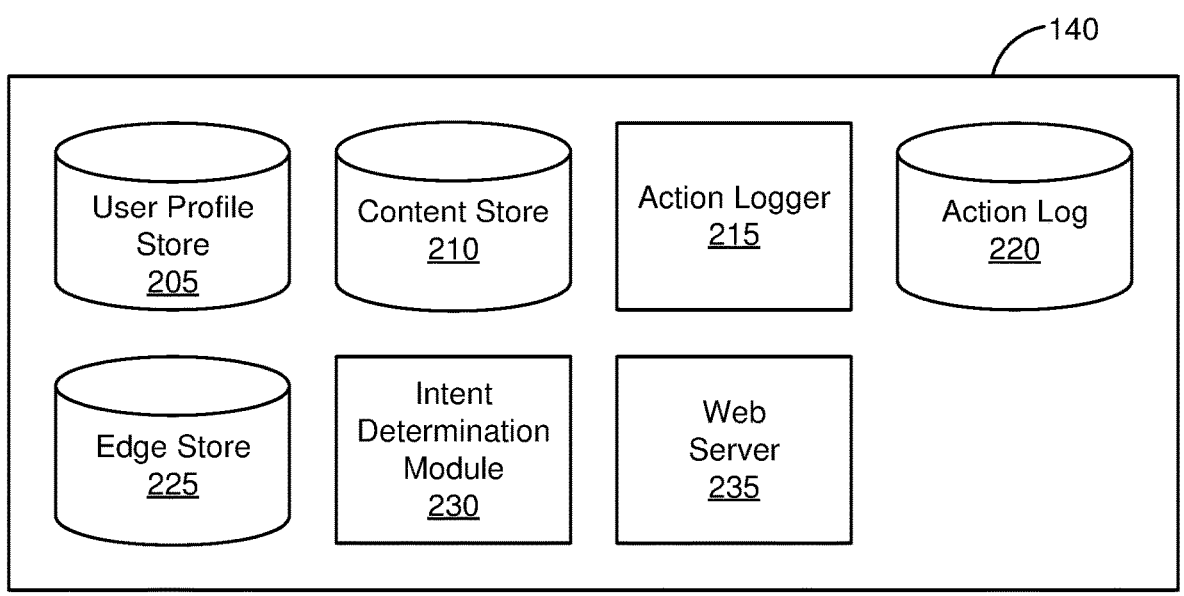
FIG. 2 illustrates a block diagram of an example online system, in accordance with an embodiment.

FIG. 2 illustrates a block diagram of an example online system 140, in accordance with an embodiment. The online system 140 shown in FIG. 2 can include a user profile store 205, a content store 210, an action logger 215, an action log 220, an edge store 225, an intent determination module 230, and a web server 235. In other embodiments, the online system 140 may include additional, fewer, or different components/modules for various applications. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, modules can be implemented, in part or in whole, as software running on one or more computing devices or systems, such as on a user or client computing device. For example, a module or at least a portion thereof can be implemented as or within an application (e.g., app), a program, an applet, or an operating system, etc., running on a user computing device or a client/user computing system. In another example, a module or at least a portion thereof can be implemented using one or more computing devices or systems which can include one or more servers, such as network servers or cloud servers. In some instances, a module can, in part or in whole, be implemented within or configured to operate in conjunction with a social networking system (or service), such as the online system 140 or the social networking system. Moreover, conventional components such as network interfaces, security functions, load balancers, failover servers, management and network operations consoles, etc., are not explicitly shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content can be text, image, audio, video, or any other suitable data presented to a user. In various embodiments, the content also specifies a page of content. For example, a content item can include a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Further, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 can be uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Furthermore, the intent determination module 230 can be configured to facilitate determining an intent of a user based on interaction data associated with the user. In some embodiments, the intent determination module 230 can facilitate generating or acquiring a plurality of features for each tracking pixel in a set of tracking pixels based on a set of one or more content items associated with each tracking pixel and a set of one or more landing pages associated with each tracking pixel. For example, tracking pixels can be implemented at various landing pages or other web pages of a third party, and content items can be provided to users to enable the users to access the landing pages, which can cause the tracking pixels to be triggered, executed, or fired. Similarly, a tracking pixel can be fired as a user loads different web pages (or web page portions) of the third party website. For example, if the user loads a shopping cart page (or shopping cart page portion) after putting a product in a shopping cart, the tracking pixel may report to the online system a shopping cart event for the user. Similarly, if the user loads a checkout page or a purchase confirmation page, the tracking pixel can report to the online system each of these events and certain details associated with each (e.g., user data, the product purchased, price, other user actions taken, etc.). In some cases, at least one landing page in the set of landing pages can be different from an online system 140 or a social networking system. A landing page can, for example, be associated with a third party website that is separate from the online system 140 or the social networking system. The intent determination module 230 can also facilitate acquiring interaction data associated with users of the online system 140 or the social networking system. In some instances, when a user of the social networking system visits or accesses landing pages at which tracking pixels are implemented, the tracking pixels can fire or execute, thereby causing information to be transmitted to and acquired by the social networking system (e.g., transmitted to and acquired by the intent determination module 230 of the social networking system). In some cases, for example, information or data can be collected/acquired as one or more mobile application events from a mobile application of a third party that is configured to use a software development kit (SDK) or application programming interface (API) associated with the online system for delivering data about user interactions on the mobile application.

Moreover, the intent determination module 230 can facilitate applying the interaction data associated with the user to a machine learning model trained based on (i.e., based at least in part on) the plurality of features for each tracking pixel in the set of tracking pixels. For instance, the plurality of features for the tracking pixels can be inputted as training data to train the machine learning model. The intent determination module 230 can further facilitate determining, based on applying the interaction data to the machine learning model, a prediction of an intent of the user to take action in association with a particular content item provided to the user via the social networking system. For example, the intent determination module 230 can facilitate determining a confidence score representing a likelihood that a conversion will result from the user being provided or presented with the particular content item via the social networking system. As another example, the interaction data can be used to train another model specific to a user that predicts user intent, such as whether a user likely intends to purchase a product based on the user taking certain actions that match those taken in the past right before a user purchased a product. More details regarding the intent determination module 230 are provided below with reference to FIG. 3. It should also be understood that many variations are possible. For instance, it should be appreciated that, in some embodiments, one or more functions of the intent determination module 230 can be performed by other modules/components of the online system 140. Also, in some implementations, the intent determination module 230 can perform one or more functions of another component(s)/module(s) in the online system 140.

Additionally, the web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or Blackberry OS.

Figure 3:
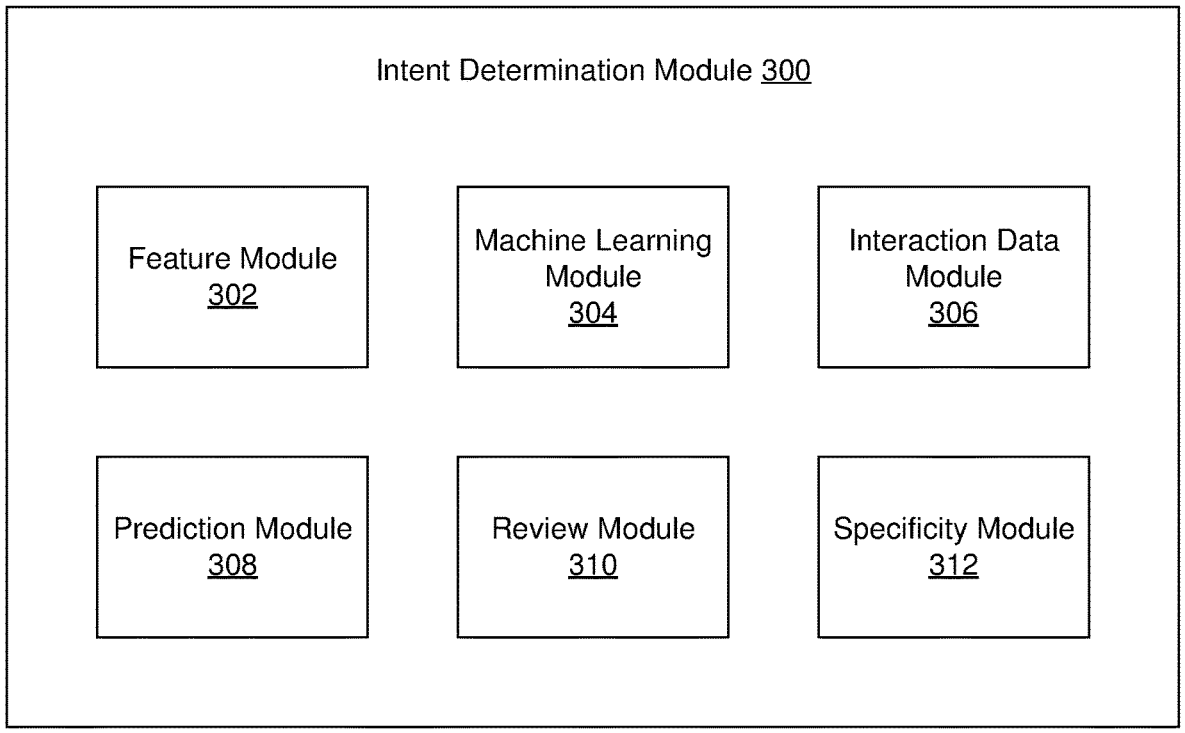
FIG. 3 illustrates a block diagram of an example intent determination module, in accordance with an embodiment.

FIG. 3 illustrates a block diagram of an example intent determination module 300, in accordance with an embodiment. In some embodiments, the example intent determination module 300 can be implemented as the intent determination module 230, described above. As shown in FIG. 3, the example intent determination module 300 can include a feature module 302, a machine learning module 304, an interaction data module 306, a prediction module 308, a review module 310, and a specificity module 312.

In one embodiment, an advertiser or a third party system can use a tracking pixel, a web beacon, or a piece of HTML code placed by the advertiser or the third party system on websites to monitor users visiting the websites who have not opted out of tracking. A tracking pixel might be included on various pages (e.g., landing pages), such as on a product page describing a product, on a shopping cart page that the user visits upon putting something into a shopping cart, on a checkout page that the user visits to checkout and purchase a product, etc. For example, a tracking pixel can result in a transparent 1×1 image, an iframe, or other suitable object being created for pages. When a user's browser (or other application) loads a page having the tracking pixel, the tracking pixel results in the user's browser attempting to retrieve the content for that pixel, and the browser contacts the online system to retrieve the content. The request sent to the online system, however, can actually include various data about the user's actions taken on the website (e.g., third party website). The website can control what data is sent to the online system. For example, a third party system providing the website may cause information about the page the user is loading (e.g., a product page, a shopping cart page, a checkout page, etc.), information on the page or about a product on the page of interest to the user (e.g., the SKU number of the product, the color, the size, the style, the current price, any discounts offered, the number of products requested, etc.), information about the user (e.g., the third party's user identifier (UID) for the user, contact information for the user, etc.), and/or other data, etc., to be transmitted to the online system.

In some embodiments, a cookie set by the online system can also be retrieved by the online system, which can include various data about the user, such as the online system's UID for the user, information about the client/user device and the browser, such as the Internet Protocol (IP) address of the client device, among other data. Tracking can also be performed on mobile applications of content providers by using a software development kit (SDK) of the online system or via an application programming interface (API) of the online system to track events (e.g., purchases) that occur by users on the content provider's app that are reported to the online system.

The online system can then use this data received about the user to serve better content to the user in the future (e.g., since the online system has further data about products purchased or browsed that might be of interest), and can also use this in retargeting of that product to the user (e.g., where the user went to the product page on the third party site by clicking on an of the third party presented to the user in the online system). The online system can also use this data in conversion tracking and reporting results of advertising campaigns to the third party. For example, if the third party has spent money at the online system to have the online system serve ads for its products, and a particular user views an ad on the online system and then purchases the product advertised (possibly at some point later, and possibly on a different device), the online system can link the purchase/conversion to the ad originally shown on the online system. Thus, the online system can include this data in its reporting to the third party system of how many conversions the ad campaign received.

In some embodiments, an online system 140 (e.g., a social networking system) can provide users with one or more content items, such as posts, shares, and/or advertisements, etc. In some cases, when users access or interact with content items, the users can be directed to landing pages, such as landing pages of third party web resources (e.g., third party websites). The landing pages can include or can have implemented one or more tracking pixels provided via the online system 140. As discussed, when the users perform certain operations or take certain actions at the landing pages, the tracking pixels can execute or fire and can transmit information to the online system 140. For instance, when an event occurs (e.g., a user click or a user interaction) that causes a tracking pixel to fire, the tracking pixel can transmit data, such as a uniform resource locator (URL), a timestamp, and/or event data, etc., to the online system 140.

The feature module 302 can be configured to facilitate generating, determining, identifying, and/or otherwise acquiring a plurality of features (e.g., attributes, characteristics, properties, metadata, etc.) for each tracking pixel in a set of tracking pixels. In some cases, the set of tracking pixels can be used by a third party system to track actions of users on the third party system. The plurality of features for each tracking pixel can be generated or acquired based on a set of one or more content items associated with each tracking pixel and a set of one or more landing pages associated with each tracking pixel, such as by analyzing and labeling the set of content items and the set of landing pages. For example, a first collection of features (e.g., attributes, characteristics, properties, metadata, etc.) associated with the set of content items can be identified, determined, or otherwise acquired. A second collection of features (e.g., attributes, characteristics, properties, metadata, etc.) associated with the set of landing pages can be identified, determined, or otherwise acquired. In this example, the plurality of features for each tracking pixel can be identified, determined, generated, or otherwise acquired from at least some of the first collection of features and/or the second collection of features. In some cases, features for the content items and landing pages can be created based on, for example, human raters analyzing the content items and landing pages to gather data and label the purpose of each (such as whether they encourage a user to install an application, sign up for a membership, to make a purchase, or otherwise). In one instance, human raters can also verify the accuracy of pixels used by third parties to detect actions by users (e.g., whether a pixel correctly reports that a user had a purchase event). Many variations are possible.

In some embodiments, the machine learning module 304 can facilitate training at least one machine learning model based on (i.e., based at least in part on) the generated or acquired plurality of features for each tracking pixel in the set of tracking pixels. The generated/acquired plurality of features for each tracking pixel can include, can incorporate, or can be derived from content item attributes and/or landing page attributes. The machine learning module 304 can, for instance, train a machine learning model based on the features generated about what particular action a given content item and landing page associated with each tracking pixel is directed to getting a user to take. In some cases, the same or a separate machine learning model can also be trained based on user attributes. For example, the machine learning model can be further trained based on features generated for the user to predict an intent of the user to take a future particular action based on the user having again had interactions similar to those that ultimately led to the user taking the previous particular action. The machine learning module 304 can apply or utilize one or more machine learning techniques to generate the machine learning model, such as an intent determination model. When applied with (i.e., inputted with) user interaction data, the model can output indications of whether a user has an intention to take action with respect to one or more content items presented to the user.

As part of the generation of the machine learning model or the intent determination model, the machine learning module 304 can form or acquire training data (e.g., including features associated with tracking pixels), such as by identifying a set of positive training data that have been determined based on manual effort (e.g., via human raters) or automatic approaches to have certain property(ies) in question. For instance, the set of positive training data can include features associated with tracking pixels or user interactions, wherein the tracking pixels or user interactions have been determined based on review to have positive correlations with certain user intentions associated with user actions taken (e.g., purchases, conversions, etc.). Additionally or alternatively, in some embodiments, the machine learning module 304 can form or acquire a set of negative training data that lack the property(ies) in question. For example, the set of negative training data can include features associated with other tracking pixels or other user interactions, wherein the other tracking pixels or other user interactions have been determined based on review to have negative correlations with certain user intentions associated with user actions taken.

As discussed, the machine learning module 304 can extract or acquire features (including feature values) from the training data, the features being variables deemed potentially relevant to whether or not the data has the associated property or properties. Specifically, the features extracted or acquired by the machine learning module 304 can include, for example, a time associated with a user visitation of a landing page, a duration associated with the user visitation of the landing page, an event associated with the user visitation of the landing page, an age of the user, a location of the user, etc. These features are provided as examples for illustrative purposes and it should be understood that many variations are possible. An ordered list of the features is herein referred to as the feature vector. In one embodiment, the machine learning module 304 applies dimensionality reduction (e.g., via linear discriminant analysis (LDA), principle component analysis (PCA), etc.) to reduce the amount of data in the feature vectors to a smaller, more representative set of data.

In some implementations, the machine learning module 304 uses supervised machine learning to train the machine learning model (e.g., the intent determination model), with the feature vectors of the positive training set (and/or the negative training set) serving as the inputs. Different machine learning techniques, such as linear support vector machine (linear SVM), boosting for other algorithms (e.g., AdaBoost), neural networks, logistic regression, naïve Bayes, memory-based learning, random forests, bagged trees, decision trees, boosted trees, and/or boosted stumps, may be used alone or in combination in different embodiments. The intent determination model, when applied to a feature vector extracted or acquired from user interaction data (which can be acquired based on tracking pixels fired, triggered, or otherwise caused by the user), outputs an indication of whether the user has a particular intention, such as a Boolean yes/no estimate of whether the user has an intention to take a particular action, or a scalar value representing a probability that the user has an intention to take a particular action, etc.

In some embodiments, a validation set is formed from additional interaction data and/or tracking pixel data, other than those in the training set(s), which have already been determined to have, or to lack, the property(ies) in question. The machine learning module 304 can apply the trained intent determination model to the validation set to quantify the accuracy of the intent determination model. Common metrics applied in accuracy measurement include: Precision=TP/(TP+FP) and Recall=TP/(TP+FN), where precision is how many the intent determination model correctly predicted (TP or true positives) out of the total it predicted (TP+FP or false positives), and recall is how many the intent determination model correctly predicted (TP) out of the total number that did have the property(ies) in question (TP+FN or false negatives). The F score (F-score=2*PR/(P+R)) unifies precision and recall into a single measure. In one embodiment, the machine learning module 304 iteratively re-trains the machine learning model (e.g., the intent determination model) until the occurrence of a stopping condition, such as the accuracy measurement indication that the model is sufficiently accurate, or a number of training rounds having taken place, etc. It should be understood that there can be many variations associated with the disclosed technology.

Continuing with FIG. 3, the interaction data module 306 can be configured to facilitate generating or acquiring interaction data associated with a user of an online system or a social networking system. Moreover, the interaction data module 306 can generate, create, identify, or otherwise acquire a plurality of features for the user based on interaction data associated with the user relating to prior interactions by the user that relate to content provided to the user that ultimately led to the user taking a previous particular action. In some instances, the interaction data module 306 can receive, obtain, or otherwise acquire interaction data associated with the user based on receiving information associated with one or more tracking pixels that have fired due to the user interacting with one or more third party web resources, such as one or more third party landing pages. For example, when a user clicks or taps on a button to make a purchase at a landing page, a tracking pixel implemented at the landing page can be instructed to fire or execute. The fired tracking pixel can cause information about the purchase event, information about the time of the user interaction (e.g., click, tap, visit), information about the duration of the user interaction with the landing page, information about one or more properties of the landing page, information about one or more properties of a content item that enabled the user to access or reach the landing page, information about the user, and/or other information etc., to be transmitted to the online system 140 (e.g., to the interaction data module 306 of the online system 140).

Furthermore, the prediction module 308 can be configure to facilitate applying or inputting the interaction data associated with the user to the machine learning model trained based on the plurality of features for each tracking pixel in the set of tracking pixels. In some embodiments, various modules of the disclosed technology can work or operate in conjunction. For example, the prediction module 308 and the machine learning module 304 can operate together to cause the interaction data associated with the user to be inputted into the trained machine learning model (e.g., the intent determination model). Based on applying or inputting the interaction data to the machine learning model, the prediction module 308 can generate, make, or otherwise determine a prediction of an intent of the user to take action in association with a particular content item provided to the user via the online system or the social networking system. In some cases, the machine learning model can be applied or utilized to predict the intent of the user to take a future particular action and/or to select content items directed to getting the user to take the future particular action. The online system can then provide a particular content item of the selected content items to the user based on the intent predicted for the user. Many variations associated with the disclosed technology are possible.

In one instance, the prediction module 308 can determine the prediction of the intent of the user based on determining a confidence score representing a likelihood that a conversion will result from the user being provided with the particular content item. For example, there can be a set of content items provided to the user. For each respective content item, the prediction module 308 can determine a respective prediction of the user's intent to take action due to being presented with the respective content item. The respective prediction can include a respective confidence score indicating how likely a conversion will occur with respect to the user. Moreover, predictions can be personalized for various users in the online system 140 or the social networking system.

In some cases, another confidence score representing another likelihood that another conversion will result from the user being provided with another content item via the social networking system can be determined, by the prediction module 308, based on applying the interaction data to the machine learning model. The online system 140 or the social networking system can then select, based on the confidence score and the other confidence score, respectively, to present to the user at least one of the particular content item or the other content item. For example, if one of the confidence scores is higher than the other, the online system 140 or the social networking system can select to present the content item associated with the higher confidence score. Again, it should be appreciated that many variations are possible.

Additionally, the review module 310 can be configured to facilitate various reviewing processes. Reviewing processes can filter out insignificant, irrelevant, inappropriate, and/or other unsuitable data. In some embodiments, the review module 310 can cause information associated with a particular tracking pixel in the set of tracking pixels to be provided for review. The review of the information associated with the particular tracking pixel can be based on manual effort (e.g., via human raters), an automatic process, and/or any combination thereof. The review module 310 can also be configured to receive or acquire feedback from the review of the information associated with the particular tracking pixel. The feedback from the review can indicate whether or not, or to what extent, the information associated with the particular tracking pixel is accurate, applicable, and/or useful. The review module 310 and the feature module 302 can be configured to work in conjunction to facilitate applying, based on the feedback from the review, one or more weights to one or more features for the particular tracking pixel. The one or more weights applied to the one or more features for the particular tracking pixel can be based on how accurate, applicable, and/or useful, etc., the particular tracking was determined to be from the review. Moreover, the machine learning model can be trained based on the one or more features subsequent to the one or more weights being applied. As such, the training of the machine learning model can disregard or discount features of tracking pixels that are insignificant, irrelevant, inappropriate and/or otherwise unsuitable (e.g., based on lower weights applied to such tracking pixels).

In some implementations, the review module 310 can also enable the set of one or more content items associated with each tracking pixel and the set of one or more landing pages associated with each tracking pixel to be reviewed prior to generating or acquiring the plurality of features for each tracking pixel in the set of tracking pixels. In one instance, the review module 310 can provide one or more tools, interfaces, and/or other components to facilitate manually reviewing (e.g., via human raters) the content items and/or the landing pages. Many variations are possible.

Further, the specificity module 312 can be configured to facilitate determining a level of specificity associated with the intent of the user to take action. In some cases, the specificity module 312 can make a prediction, estimation, or determination, etc., regarding how specific the user's intent may be. The level of specificity predicted, estimated, or determined by the specificity module can indicate that the intent of the user to take action is associated with at least one of a particular product (or service), a particular brand, a particular manufacturer, a particular retailer, or a particular product (or service), type, etc. For example, the level of specificity can indicate that the user has an intention to purchase a specific product, to purchase a product(s) having a specific brand, to purchase a product(s) produced from a specific manufacturer, to purchase a product(s) offered by a specific retailer, or to purchase a product(s) within a specific category/type of products, etc.

Utilizing Interaction Data to Determine Intent

FIG. 4A illustrates a flowchart describing an example process 400 of determining intent based on interaction data, in accordance with an embodiment. It should be understood that there can be additional, fewer, or alternative steps performed in similar or alternative orders, or in parallel, within the scope of the various embodiments unless otherwise stated.

In the example process 400, at block 402, a plurality of features can be generated, identified, or acquired for each tracking pixel in a set of tracking pixels used by a third party system to track actions of users on the third party system. In some embodiments, the features can be generated based on an analysis and labeling of a set of one or more content items associated with each tracking pixel and/or a set of one or more landing pages associated with each tracking pixel. At block 404, a machine learning model can be trained, generated, developed, or refined based on the features generated about what particular action a given content item and landing page associated with each tracking pixel is directed to getting a user to take. At block 406, a plurality of features for the user can be generated, identified, or acquired based on interaction data associated with the user relating to prior interactions by the user that relate to content provided to the user that ultimately led to the user taking a previous particular action. At block 408, the same or a separate machine learning model can be trained, generated, developed, or refined based on the features generated for the user to predict an intent of the user to take a future particular action based on the user having again had interactions similar to those that ultimately led to the user taking the previous particular action. At block 410, the machine learning model can be applied or utilized to predict the intent of the user to take the future particular action and to select content items directed to getting the user to take the future particular action. At block 412, a particular content item of the selected content items can be provided, presented, or displayed to the user based on the intent predicted for the user. Many variations are possible.

FIG. 4B illustrates a flowchart describing an example process 450 of determining intent based on interaction data, in accordance with an embodiment. Again, it should be appreciated that there can be additional, fewer, or alternative steps performed in similar or alternative orders, or in parallel, within the scope of the various embodiments unless otherwise stated.

In the example process 450, at block 452, information associated with a particular tracking pixel in the set of tracking pixels can be provided for review. At block 454, feedback from the review of the information associated with the particular tracking pixel can be acquired. At block 456, one or more weights can be applied, based on the feedback from the review, to one or more features for the particular tracking pixel. In some cases, the machine learning model, discussed previously, can be trained based on the one or more features subsequent to the one or more weights being applied.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   generating, by an online system, a plurality of features for each tracking pixel in a set of tracking pixels used by a third party system to track actions of users on the third party system, the features generated based on an analysis and labeling of:
      a set of one or more content items associated with each tracking pixel, and
      a set of one or more landing pages associated with each tracking pixel;
   training, by the online system, a machine learning model based on the features generated about what particular action a given content item and landing page associated with each tracking pixel is directed to getting a user to take;
   generating, by the online system, a plurality of features for the user based on interaction data associated with the user relating to prior interactions by the user that relate to content provided to the user that ultimately led to the user taking a previous particular action;
   training, by the online system, the machine learning model based on the features generated for the user to predict an intent of the user to take a future particular action based on the user having again had interactions similar to those that ultimately led to the user taking the previous particular action;
   applying, by the online system, the machine learning model to predict the intent of the user to take the future particular action and to select content items directed to getting the user to take the future particular action, wherein the intent of the user to take the future particular action is predicted based on determining a confidence score representing a likelihood that a conversion will result from the user being provided with a particular content item via the online system; and
   providing, by the online system, the particular content item of the selected content items to the user based on the intent predicted for the user.

2. The computer-implemented method of claim 1, further comprising:
   providing, for review, information associated with a particular tracking pixel in the set of tracking pixels;
   acquiring feedback from the review of the information associated with the particular tracking pixel; and
   applying, based on the feedback from the review, one or more weights to one or more features for the particular tracking pixel, wherein the machine learning model is trained based on the one or more features subsequent to the one or more weights being applied.

3. The computer-implemented method of claim 2, wherein the review of the information associated with the particular tracking pixel is based on manual effort.

4. The computer-implemented method of claim 1, wherein the set of one or more content items associated with each tracking pixel and the set of one or more landing pages associated with each tracking pixel are reviewed based on manual effort prior to generating the plurality of features for each tracking pixel in the set of tracking pixels.

5. The computer-implemented method of claim 1, further comprising:
   determining, based on the machine learning model, another confidence score representing another likelihood that another conversion will result from the user being provided with another content item via the online system; and
   selecting, based on the confidence score and the other confidence score, respectively, to present to the user at least one of the particular content item or the other content item.

6. The computer-implemented method of claim 1, further comprising:
   determining a level of specificity associated with the intent of the user to take the future particular action.

7. The computer-implemented method of claim 6, wherein the level of specificity indicates that the intent of the user to take the future particular action is associated with at least one of a particular product, a particular brand, a particular manufacturer, a particular retailer, or a particular product type.

8. The computer-implemented method of claim 1, wherein at least one landing page in the set of one or more landing pages is different from the online system.

9. The computer-implemented method of claim 1, wherein the interaction data associated with the user includes information provided by at least one tracking pixel associated with the user, wherein the at least one tracking pixel is implemented via at least one landing page, and wherein the information provided by the at least one tracking pixel includes at least one of information about an event at the at least one landing page, information about a time of a user interaction with respect to the at least one landing page, information about a duration of the user interaction with respect to the at least one landing page, information about one or more properties of the at least one landing page, information about one or more properties of at least one content item that enabled the user to access the at least one landing page, or information about the user.

10. A system comprising:
at least one processor; and
a memory storing instructions that, when executed by the at least one processor, cause the system to perform:
generating a plurality of features for each tracking pixel in a set of tracking pixels used by a third party system to track actions of users on the third party system, the features generated based on an analysis and labeling of:
a set of one or more content items associated with each tracking pixel, and
a set of one or more landing pages associated with each tracking pixel;
training a machine learning model based on the features generated about what particular action a given content item and landing page associated with each tracking pixel is directed to getting a user to take;
generating a plurality of features for the user based on interaction data associated with the user relating to prior interactions by the user that relate to content provided to the user that ultimately led to the user taking a previous particular action;
training the machine learning model based on the features generated for the user to predict an intent of the user to take a future particular action based on the user having again had interactions similar to those that ultimately led to the user taking the previous particular action;
applying the machine learning model to predict the intent of the user to take the future particular action and to select content items directed to getting the user to take the future particular action, wherein the intent of the user to take the future particular action is predicted based on determining a confidence score representing a likelihood that a conversion will result from the user being provided with a particular content item via the online system; and
providing the particular content item of the selected content items to the user based on the intent predicted for the user.

11. The system of claim 10, wherein the instructions cause the system to further perform:
providing, for review, information associated with a particular tracking pixel in the set of tracking pixels;
acquiring feedback from the review of the information associated with the particular tracking pixel; and
applying, based on the feedback from the review, one or more weights to one or more features for the particular tracking pixel, wherein the machine learning model is trained based on the one or more features subsequent to the one or more weights being applied.

12. The system of claim 11, wherein the review of the information associated with the particular tracking pixel is based on manual effort.

13. The system of claim 10, wherein the set of one or more content items associated with each tracking pixel and the set of one or more landing pages associated with each tracking pixel are reviewed based on manual effort prior to generating the plurality of features for each tracking pixel in the set of tracking pixels.

14. The system of claim 10, wherein the instructions cause the system to further perform:
determining a level of specificity associated with the intent of the user to take the future particular action.

15. The system of claim 14, wherein the level of specificity indicates that the intent of the user to take the future particular action is associated with at least one of a particular product, a particular brand, a particular manufacturer, a particular retailer, or a particular product type.

16. A computer-implemented method comprising:
generating, by an online system, a plurality of features for each tracking pixel in a set of tracking pixels used by a third party system to track actions of users on the third party system, the features generated based on an analysis and labeling of:
a set of one or more content items associated with each tracking pixel, and
a set of one or more landing pages associated with each tracking pixel;
training, by the online system, a machine learning model based on the features generated about what particular action a given content item and landing page associated with each tracking pixel is directed to getting a user to take;
generating, by the online system, a plurality of features for the user based on interaction data associated with the user relating to prior interactions by the user that relate to content provided to the user that ultimately led to the user taking a previous particular action;
training, by the online system, the machine learning model based on the features generated for the user to predict an intent of the user to take a future particular action based on the user having again had interactions similar to those that ultimately led to the user taking the previous particular action;
determining a level of specificity associated with the intent of the user to take the future particular action;
applying, by the online system, the machine learning model to predict the intent of the user to take the future particular action and to select content items directed to getting the user to take the future particular action based at least in part on the determined level of specificity; and
providing, by the online system, a particular content item of the selected content items to the user based on the intent predicted for the user.

17. The method of claim 16, further comprising:
providing, for review, information associated with a particular tracking pixel in the set of tracking pixels;
acquiring feedback from the review of the information associated with the particular tracking pixel; and
applying, based on the feedback from the review, one or more weights to one or more features for the particular tracking pixel, wherein the machine learning model is trained based on the one or more features subsequent to the one or more weights being applied.

18. The method of claim 16, wherein the set of one or more content items associated with each tracking pixel and the set of one or more landing pages associated with each tracking pixel are reviewed based on manual effort prior to generating the plurality of features for each tracking pixel in the set of tracking pixels.

19. The method of claim 16, wherein the intent of the user to take the future particular action is predicted based on determining a confidence score representing a likelihood that a conversion will result from the user being provided with the particular content item via the online system.

20. The method of claim 16, wherein the level of specificity indicates that the intent of the user to take the future particular action is associated with at least one of a particular product, a particular brand, a particular manufacturer, a particular retailer, or a particular product type.

\* \* \* \* \*